H. P. DE CORREVONT.
FLEXIBLE SHAFT LUBRICATION.
APPLICATION FILED OCT. 18, 1919.
1,357,965.
Patented Nov. 9, 1920.
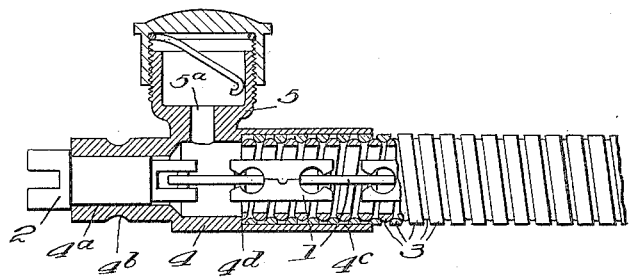
Inventor;
Howard P. De Correvont,
by Burton & Burton
his Attys.
Witness;

UNITED STATES PATENT OFFICE.

HOWARD P. DE CORREVONT, OF CHICAGO, ILLINOIS, ASSIGNOR TO STEWART-WARNER SPEEDOMETER CORPORATION, OF CHICAGO, ILLINOIS, A CORPORATION OF VIRGINIA.

FLEXIBLE-SHAFT LUBRICATION.

1,357,965.  Specification of Letters Patent.  Patented Nov. 9, 1920.

Application filed October 18, 1919. Serial No. 331,708.

*To all whom it may concern:*

Be it known that I, HOWARD P. DE CORREVONT, a citizen of the United States, residing at Chicago, in the county of Cook and the State of Illinois, have invented certain new and useful Improvements in Flexible-Shaft Lubrication, of which the following is a specification, reference being had to the accompanying drawings, forming a part thereof.

The purpose of this invention is to provide an improved construction of flexible shaft casing for providing grease to the casing to lubricate the flexible shaft therein. It consists in the elements and features of construction shown and described as indicated in the claims.

In the drawings:

Figure 1 is an axial section of a portion of a flexible shaft casing with the shaft therein equipped with this invention.

The drawing shows a flexible shaft which is of common construction as to its general character, comprising the flexible shaft member of the chain type,—that is, comprising links, 1, 1, and having a terminal coupling member, 2, the flexible casing, 3, in which said shaft is inclosed having a terminal fitting, 4, which affords a journal bearing at $4^a$, for the shaft coupling terminal, 2; the fitting, 4, is provided at the outer end with any usual means for coupling it to the bearing of the shaft with which the flexible shaft coupling, 2, is designed to be connected for operation. In the drawing the construction for this purpose consists merely in providing said coupling, 4, with a cylindrical terminal portion having a groove, $4^b$, whereby it is adapted to be inserted into the bearing with which it is to be connected and secured by a key engaging said groove. This invention does not exclude any other familiar or effective means of connecting the coupling.

The invention herein claimed consists in providing a grease cup on the fitting, 4, for holding grease to lubricate the shaft within the casing, in substitution of the heretofore common method of filling the casing with grease when the flexible shaft member is first assembled and dis-assembling whenever it is necessary to resupply the grease.

The terminal fitting, 4, for the purpose indicated comprises at the end at which it is to be connected to the shaft bearing, a journal bearing portion, $4^a$, to afford bearing for the shaft coupling-member, 2, and at the opposite end a counterbore, $4^c$, adapted to receive the flexible casing, 3, which is secured therein in any usual manner. In the length of the fitting, 4, between the end of the flexible casing, 3, in the counterbore, and the seat of the shaft coupling member, 2, in the journal bearing portion, $4^a$, of said fitting, there is provided the grease cup, 5, projecting off rigidly,—preferably radially, with respect to the fitting but not necessarily so,—having its discharge duct, $5^a$, opening into the chamber,—that is, into the bore of the fitting beyond the end of the flexible casing, 3, therein, so as to admit grease from the grease cup into the cavity of the fitting. Preferably, as shown, the grease cup discharge duct, $5^a$, opens in the counterbore,—that is to say, the counterbore extends beyond the point at which the flexible casing, 3, is entered into the fitting, so that there is formed an annular cavity around the shaft between its seated portion in the journal bearing and the end of the flexible casing, giving free and easy access for the grease from the grease duct, $5^a$, into the cavity of the flexible casing. Also, preferably, the counterbore comprises a larger part into which the flexible casing is intruded and in which it is closely seated and secured, and a smaller part between said larger part and the journal bearing portion, $4^a$, the two parts,—respectively $4^a$ and $4^c$,—by reason of their difference in diameter forming a stop shoulder, $4^d$, for the inserted end of the flexible casing.

I claim:—

1. In combination with a flexible shaft casing, a terminal fitting therefor comprising a journal bearing at one end for the coupling member of the flexible shaft, a counterbore at the other end in which the flexible casing is inserted and secured to the fitting, and a grease cup projecting off laterally and having its discharge duct opening in the fitting beyond the end of the flexible casing therein.

2. In the construction defined in claim 1, the fitting having the counterbore extending a substantial distance in beyond the end of the flexible casing entered therein, whereby an annular cavity is formed between the end of the casing and the journal bearing of the shaft coupling terminal, for access of grease to the flexible casing.

3. In the construction defined in claim 1, the fitting having the counterbore extending a substantial distance in beyond the end of the flexible casing entered therein, and comprising a larger and a smaller part with a shoulder between them for stopping the end of the flexible casing.

4. In the construction defined in claim 1, the grease cup being integral with the journal bearing part of the fitting.

5. In the construction defined in claim 1, the grease cup being integral with the flexible-casing-encircling part of the fitting.

6. A flexible shaft member comprising a flexible casing and a flexible shaft extending therein which has a terminal coupling member, and a terminal fitting for the flexible casing comprising at one end a journal bearing for the shaft coupling member, and at the other end a seat for the flexible casing, and a grease cup rigid with said fitting connected for discharge thereinto between its ends.

In testimony whereof, I have hereunto set my hand at Chicago, Illinois, this 10th day of October, 1919.

HOWARD P. DE CORREVONT.